United States Patent
Vincon

(10) Patent No.: US 9,752,700 B2
(45) Date of Patent: Sep. 5, 2017

(54) VALVE DEVICE AND USE OF SUCH A VALVE DEVICE

(71) Applicant: ETO MAGNETIC GMBH, Stockach (DE)

(72) Inventor: Peter Vincon, Stockach (DE)

(73) Assignee: ETO MAGNETIC GmbH, Stockach (DE)

( * ) Notice: Subject to any disclaimer, the term of this patent is extended or adjusted under 35 U.S.C. 154(b) by 95 days.

(21) Appl. No.: 14/442,496

(22) PCT Filed: Nov. 13, 2013

(86) PCT No.: PCT/EP2013/073756
§ 371 (c)(1),
(2) Date: May 13, 2015

(87) PCT Pub. No.: WO2014/076145
PCT Pub. Date: May 22, 2014

(65) Prior Publication Data
US 2016/0273673 A1    Sep. 22, 2016

(30) Foreign Application Priority Data

Nov. 15, 2012   (DE) .................. 10 2012 111 021

(51) Int. Cl.
| F16K 31/36 | (2006.01) |
| F16K 31/122 | (2006.01) |
| F04B 17/04 | (2006.01) |
| F04B 53/10 | (2006.01) |
| F01P 7/14 | (2006.01) |
| F04B 7/00 | (2006.01) |
| F15B 11/00 | (2006.01) |

(Continued)

(52) U.S. Cl.
CPC ............ *F16K 31/1221* (2013.01); *F01P 7/14* (2013.01); *F04B 7/0076* (2013.01);
(Continued)

(58) Field of Classification Search
CPC ...... F04B 7/0076; F04B 53/10; F04B 53/125; F15B 9/03; F15B 15/18; F16K 31/1221; F01P 2007/146
(Continued)

(56) References Cited

U.S. PATENT DOCUMENTS 2,948,118 A * 8/1960 Exner ................. F16K 31/02
                                                     236/74 A
3,120,103 A * 2/1964 Beard ................. F15B 15/18
                                                     137/563

(Continued)

FOREIGN PATENT DOCUMENTS

DE    2050761 A    5/1971
DE    3019626 C2   6/1984

(Continued)

*Primary Examiner* — Reinaldo Sanchez-Medina
(74) *Attorney, Agent, or Firm* — Bachman & LaPointe, PC

(57) ABSTRACT

A valve device, comprising a valve tappet (18), which causes a controlled opening or blocking of a fluid flow channel (16) in an engagement position on a valve seat (22) and which can be brought from a starting position to the engagement position as a reaction to an application of pressure by means of a pressure fluid, wherein the pressure fluid is conveyed by electromagnetically driven pumping element (24) into a pressure chamber (44) associated with the valve tappet in such a way that the application of pressure for driving the valve tappet is accomplished by a plurality of pumping strokes of the pumping element, which has a conveying piston (26), in particular a reciprocating piston.

12 Claims, 2 Drawing Sheets

(51) Int. Cl.
*F16K 15/02* (2006.01)
*F15B 13/042* (2006.01)
*F15B 15/18* (2006.01)

(52) U.S. Cl.
CPC .......... *F04B 17/042* (2013.01); *F04B 17/044* (2013.01); *F04B 53/10* (2013.01); *F15B 11/003* (2013.01); *F16K 15/028* (2013.01); *F16K 31/1223* (2013.01); *F01P 2007/146* (2013.01); *F15B 13/042* (2013.01); *F15B 15/18* (2013.01)

(58) Field of Classification Search
USPC ............. 137/38, 110, 115.07, 115.25, 487.5, 137/489.5, 490; 251/25, 30.02, 30.03, 251/30.04, 30.05, 57
See application file for complete search history.

(56) References Cited

U.S. PATENT DOCUMENTS

| | | | |
|---|---|---|---|
| 3,200,591 A | 8/1965 | Ray | |
| 4,054,155 A * | 10/1977 | Hill | F15B 15/18 137/625.48 |
| 4,247,077 A | 1/1981 | Banick et al. | |
| 4,442,680 A * | 4/1984 | Barbier | F25B 41/043 137/489.5 |
| 4,463,773 A | 8/1984 | Kojima et al. | |
| 4,475,710 A | 10/1984 | Leupers | |
| 5,348,036 A * | 9/1994 | Oksanen | G05D 7/03 137/1 |
| 5,460,196 A * | 10/1995 | Yonnet | G05D 16/2093 137/12 |
| 5,758,862 A * | 6/1998 | Sturman | F15B 15/18 251/25 |
| 5,797,583 A | 8/1998 | Murata et al. | |
| 6,913,240 B1 * | 7/2005 | MacKenzie | E21B 33/0355 251/57 |

FOREIGN PATENT DOCUMENTS

| | | |
|---|---|---|
| DE | 4402647 C1 | 4/1995 |
| DE | 102007007297 A1 | 8/2008 |
| DE | 102010042944 A1 | 4/2012 |
| EP | 0696682 A1 | 2/1996 |
| GB | 1281133 A | 7/1972 |

* cited by examiner

VALVE DEVICE AND USE OF SUCH A VALVE DEVICE

BACKGROUND OF THE INVENTION

The present invention relates to a valve device according to the preamble of the main claim, as it is known from DE 44 02 647 C1. Such a device, in the form of a check valve, for example, is generally known as a hydraulic or pneumatic valve, and is used for a wide variety of applications. A typical application is the blocking or opening (controlled by the valve) of a cooling circuit in a motor vehicle.

Such applications are characterized by the fact that relatively large expanses of the fluid flow channel must be blocked, which requires correspondingly large restoring forces (due to the large pressure application surfaces). It is common practice, particularly in the described context of motor vehicle construction, to use an electromagnetic actuator to actuate the valve, thereby causing the valve tappet to carry out a blocking or opening movement, but the aforementioned large pressure application surfaces nevertheless demand correspondingly large (and accordingly heavy), electromagnetic devices. Apart from the technical manufacturing effort involved, such devices are awkward to install, consume substantial amounts of electrical energy, and are (disadvantageously) heavy.

Therefore, it must be assumed that, particularly when rapid switching times or other dynamic properties of the valve device are not of the greatest importance, the use of "piloted" valves for similar or comparable applications is known from the prior art. Such piloting would further assist the blocking movement of the valve tappet by means of a "pilot pressure" or "pilot force", so that to this extent the actual size of the actuator can then be smaller.

The object of the present invention is therefore to extend the usability of a species-related valve device, particularly in the form of a check valve for large nominal diameters, and in such context particularly to optimise an actuator system essential for the application of a restoring force in terms of the dimensioning and energy consumption thereof, and thus to provide a valve device that is able to used and installed flexibly and guarantees good operating reliability, but at the same time has a simple construction.

SUMMARY OF THE INVENTION

The object is solved with the valve device having the features of the main claim; advantageous refinements of the invention are described in the subordinate claims. Additional, independent protection is claimed within the scope of the present invention for a use of such a valve device for the controlled blocking or opening of a cooling circuit in a motor vehicle.

Advantageously according to the invention, as in a pilot arrangement, the pressure fluid is transported by electromagnetically driven pumping means into a pressure chamber allocated to the valve tappet, in which chamber it is compressed by multiple pumping strokes of a delivery piston of the pumping means until the pressure of the pressure fluid in the pressure chamber is sufficient to move the valve tappet from the initial position thereof to the engaged position against the valve seat, thereby bringing about the blocked state.

With the above arrangement, it then becomes possible to use compact, economical pumping means designed in conformance with electromagnetic actuation principles to actuate the valve tappet simply via the compressed pressure fluid, in which case it is preferable for the valve device of the invention to have the form of a hydraulic valve (wherein the pressure fluid is then a suitable hydraulic fluid), but alternatively it may also be produced as a pneumatic valve and valve control principle, for example.

With regard to creating the invention, it is particularly preferred to provide the inventive electromagnetically driven pumping means with a reciprocating piston as a delivery piston, so that the pump strokes are executed as oscillating and translational movements of the reciprocating piston, which cause the pressure fluid to be compressed in the pressure chamber. In practical dimensioning, again it is preferred according to a refinement of the invention to set the multiple pumping strokes in a range from about 5 to about 60 in order to initiate the switching operation (e.g., the blocking operation) of the valve tappet (that is say the movement of the tappet from the starting position into the engagement position with the valve seat); this happens in a typically anticipated context here, according to which the time and/or dynamic requirements of the valve device according to the invention are such that a corresponding oscillation time is available for the reciprocating piston.

According to a further refinement, and in a manner that is otherwise generally known and has been proven in large-scale production, the electromagnetic drive for the pumping means is provided by the interaction between the reciprocating piston, which functions as the movement anchor and cooperates electromagnetically with a stationary coil unit (plus a stationary yoke and core unit correspondingly integrated in a magnetic circuit), wherein then in otherwise known manner the reciprocating piston is caused to begin its oscillating movement in response to the energisation of the coil unit.

For such an oscillation, that is to say corresponding to a continuous periodic motion between two stroke end positions along a longitudinal axis of movement of the piston, it is favourable and preferred within the scope of preferred embodiments of the invention to provide two signal levels, between which the current supply moves as the actuating signal for the coil unit, both signal levels being different from zero according to the further refinement. As a consequence, during the actuation operation of the reciprocating pistons, the defined stroke end positions lie beyond at least one physical limit stop of the reciprocating pump, so that, again in accordance with a refinement of the invention and as will be explained in the following, targeted operating states can be assumed in the event of a power failure or the like, for example.

Also in accordance with a refinement, it is specifically provided within the scope of the present invention to operate the reciprocating piston not only against a restoring force of a spring unit acting suitably on the reciprocating piston, but in the event of a non-energised state (and thus also in the case of a power failure, etc.), said spring unit would ensure that the reciprocating piston is moved to a mechanical stop position of the piston by mechanical spring action. However, since the reciprocating piston does not reach this final state in said energised operation as a result of a normal operation between the first and second signal levels, each being non-zero, a device for the controlled venting of the pressure chamber (for the valve tappet) may be assigned to this (non-energised) end stop state in the manner provided according to the refinement of the invention and actuated in the end stop position by the reciprocating piston. In the manner of a secure operating state ("failsafe"), in the event of a power failure, the consequence of this is that, regardless of a actual pressure and/or blocking state of the valve tappet, it is always guaranteed that the valve is in the starting position in the event of power failure (or also in the deactivated state), (wherein also advantageously and in accordance with the refinement the valve tappet also cooperates with a return spring that exerts a corresponding restoring force in the direction of the starting position).

In particular, the preferred use of the invention according to the refinement in a cooling circuit or similar hydraulics-compatible fluid circuit permits a further advantageous variant of the invention, namely that the pressure fluid according to the invention is recovered directly from the fluid flow channel (and to this extent from that fluid that is to be switched via the valve according to the invention). Specifically, it is provided according to the refinement that the electromagnetically driven pumping means are equipped with an inflow arrangement for the pressure fluid, which is open to the fluid flow channel, so that for most of the pumping strokes the pressure fluid that is introduced into the pressure chamber and compressed there is recovered from the fluid flowing out of the fluid flow channel.

A further advantageous embodiment of the invention, which is particularly useful in practical operation, provides that an overpressure valve is assigned to the compression chamber associated with the valve tappet, which overpressure valve opens if a predetermined pressure threshold through the valve is exceeded, and allows pressure fluid to drain back into the fluid flow channel until the pressure threshold is restored. Such a measure has the effect of simplifying the actuation of the pumping means according to the invention, because this enables the reciprocating piston to move continuously (possibly with reduced oscillation frequency) even if the valve tappet is in an activated, i.e., blocking state, in which case the pressure relief valve then prevents overpressure and any otherwise possible damage; since leakage effects occur in practical use anyway, caused for instance by incomplete sealing or the like, an isolated pump activation would otherwise have to be assured in a significantly more complex manner, for example in response to a specific pressure measurement, in an engaged state as well.

Moreover, whereas a blocking state in the engaged position was discussed in the present (exemplary) context, it is evident to a person skilled in the art that the present invention also comprises, as a normally closed valve principle, for instance, a selectively actuated opening state in the engaged position, such that the present invention may be implemented for a variety of suitable blocking or opening principles, depending on the configuration of the valve seat or the engagement position.

In conclusion, the present invention thus succeeds in a surprisingly simple and elegant way (especially from the points of view of large-scale production, high operating reliability and compact dimensions), in combining the favourable properties of an electromagnetic actuator arrangement and the pumping means constructed on the basis thereof with a (for example, hydraulically or pneumatically operated) valve device of which the tappet, in contrast to a drive that would otherwise need to be of much larger dimensions, convey the pressure fluid into the pressure chamber by means of multiple pump strokes by the reciprocating piston.

BRIEF DESCRIPTION OF THE DRAWINGS

Further advantages, features and details of the invention will become apparent from the following description of preferred embodiments and with reference to drawing. In the drawing.

DETAILED DESCRIPTION

Figure 1:
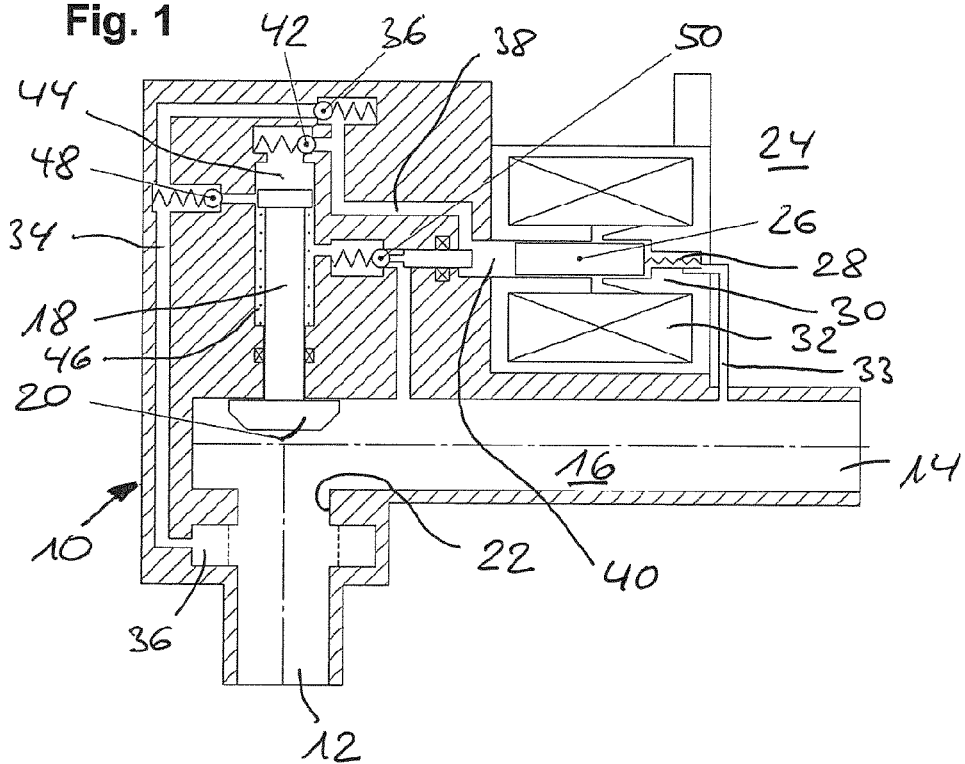
FIG. 1 is a schematic sectional view through the valve device according the invention in a preferred construction thereof, in which an electromagnetically driven reciprocating pump uses fluid drawn from the valve fluid flow channel as the pressure fluid for moving the valve tappet.

FIG. 1 shows a schematic lateral cross sectional view of a preferred embodiment of the valve device. A fluid flow channel 16 extends inside a valve housing 10 between a downwardly directed inlet 12 and a horizontal outlet 14 for a coolant in a coolant circuit of a motor vehicle that is to be switched with said valve. For this purpose, a valve tappet 18 with a flush-mounted flared sealing element 20 is fitted in a manner that will be described in detail in the following on a valve seat 22 formed in a bend of fluid flow channel 16 (engagement position), and thus causes the fluid flow to be interrupted in the fluid flow channel.

In real terms, the tappet moves (downward in the figures) from the initial position shown in FIG. 1 into the position of engagement on the valve seat due to the action of a reciprocating pump 24 mounted on housing 10, the reciprocating piston 26 of which is biased against a restoring compression spring 28 and executes a translational lengthwise movement with respect to a stator section 30 having a stationary core region in the manner of anchor.

In real terms, in otherwise known manner, reciprocating piston 26 performs a translational movement in response to energisation of stationary coil means 32, wherein in the embodiment shown here coil unit 32 is actuated via an alternating signal that varies (preferably periodically) between a lower and an upper signal level in order to generate an oscillating translational motion of reciprocating piston 26. Thus, the position of the reciprocating piston shown for example in FIG. 1 illustrates an energised state with a first signal level, whereas the piston state in FIG. 2 shows an energised state with a second (also non-zero) signal level, in which compression spring 28 is under less tension than in FIG. 1 (but is not completely unloaded).

This oscillation operation of reciprocating piston 26 now causes valve tappet 18 to fall in the manner of a hydraulic drive, by conveying coolant recovered from the inlet portion 12 of fluid flow channel 16 into a compression chamber 40 of pumping unit 24 through an intake duct 34 with upstream filtering means 36, via a first check valve 36 (as the inlet valve for this pressurised fluid) and a connecting channel 38. A pump stroke of reciprocating piston 26 that now takes place (to the left in the drawing plane of FIG. 1) then compresses the aspirated metered quantity fluid (again via channel 38) through a second check valve 42 into a pressure chamber 44 for tappet 18 (with this stroke movement, valve 36 is blocked, while valve 42, functioning as the outlet valve for the pressure fluid, allows the fluid to enter pressure chamber 44).

Subsequent pumping strokes of the oscillating reciprocating piston introduce more pressure fluid into pressure chamber 44 (which has a larger cross-section than line 38), thus increasing the pressure therein acting on tappet 18. A typical design and dimensioning of the embodiment provides that about 20 such pump strokes are required in order to move the valve tappet downwards and so switch the valve, also against a restoring force of a restoring helical spring 46 that biases valve tappet 18 toward the initial position of FIG. 1.

Figure 2:
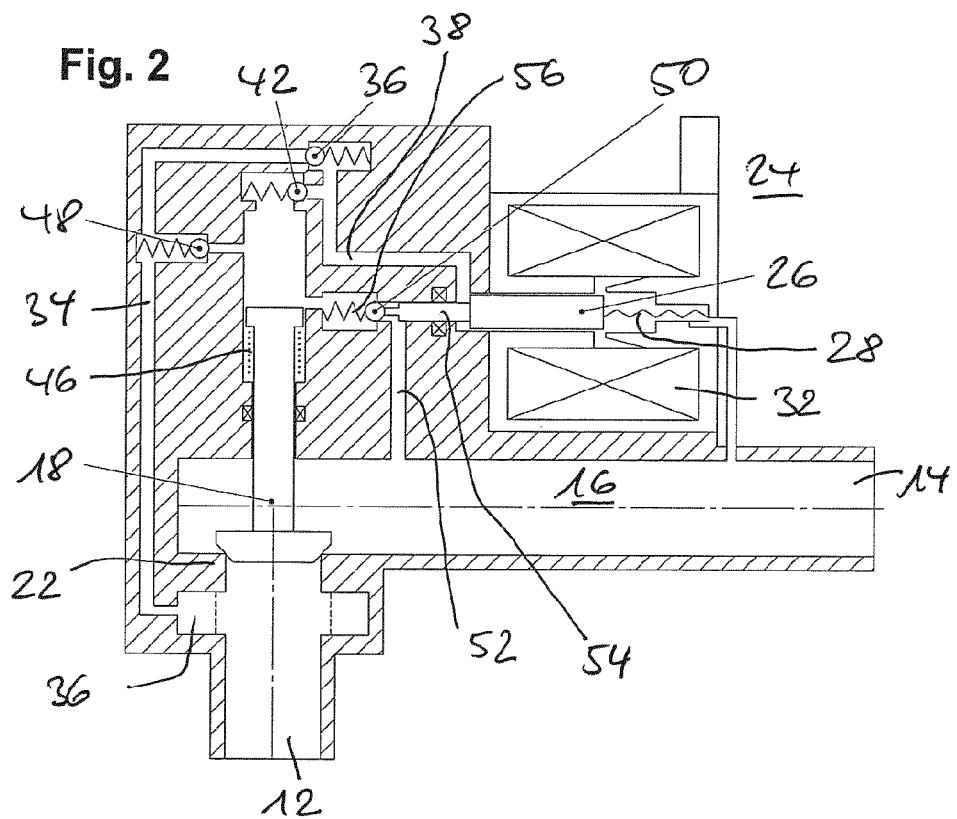
FIG. 2 is a representation similar to FIG. 1, but showing the valve tappet in the engagement position instead of in the starting position as in FIG. 1.

Such a switching state is shown in FIG. 2: tappet unit 18 with its face end closure and sealing body 20 is supported on valve seat 22, thus interrupting the fluid flow channel 16 between the inlet 12 and the outlet 14.

Since the fluid pressure in pressure chamber 44 is constantly falling due to incomplete sealing or other leakage effects, for example (and the compressed return spring 46 exerts a counteracting pressure in the blocked state of FIG. 2), in order to maintain said blocked state, more pressure fluid must be continuously introduced into pressure chamber 44 in the manner described above, but with a reduced oscillation or pumping frequency of reciprocating piston 26. In order to prevent the occurrence of harmful overpressure, a pressure relief valve 48 ensures that (at least in the blocked state of FIG. 2) when a pressure threshold predetermined by the pressure relief valve 48 is reached or exceeded, a fluid pressure in pressure chamber 44 is relieved via line 34 to fluid flow channel 16. This advantageously has the effect that pump unit 24 can continue operating even without any specific pressure sensing or pressure measuring means inside pressure chamber 44, (continuously at an advantageously reduced pressure frequency), and pressure relief valve 48 serves to establish a pressure leverage in pressure chamber 44 that maintains the valve tappet in the engaged position (the closed state of FIG. 2).

Figure 3:
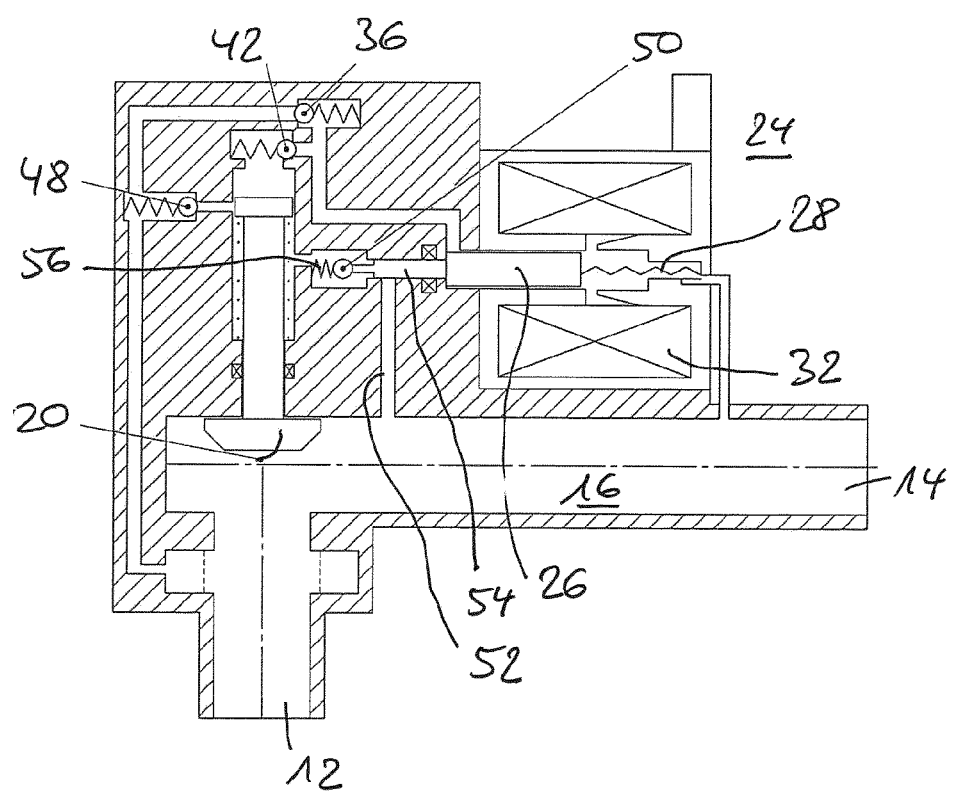
FIG. 3 is a representation similar to FIGS. 1 and 2, with the coil means in a de-energised state and an associated end limit of the reciprocating piston that activates venting means for the pressure chamber.

However, as is shown in FIG. 3, as soon as the energy supply to coil means 32 is cut off, the pressurisation of the tappet unit 18 also ends, a vent valve 50 advantageously serving this purpose. Said vent valve establishes a switched connection to fluid flow channel 16 via ventilation channel 52 and is switched by means of a vent tappet 54, which is activated by reciprocating piston 26 in the stop position shown at left in FIG. 3 (with coil means 32 de-energised). As a result of this opening operation ("venting") the pressure in pressure chamber 44 quickly drops correspondingly to the pressure that exists in flow channel 16 so that, through the effect of return spring 46, valve tappet 8 is returned to the initial position of FIG. 1 and FIG. 3. In this context, the beneficial effect of actuating the reciprocating pump by a signal switching between an upper and a lower signal level that is, however, always different from zero, becomes apparent: as a result of this, reciprocating piston 26 is unable to activate venting valve 50 during the energising operation (venting valve 50 does not open even in the energised state of the reciprocating piston shown in FIG. 2, this does not happen until the coil current has been completely deactivated, see FIG. 3, at which reciprocating piston spring 28 presses reciprocating piston 26 against valve tappet 54, thereby opening valve 50).

Regarding the dimensioning of these components in this case, spring 28 is correspondingly stronger than a valve spring 56 of venting valve 50 (if such is used as a counteracting spring).

Whereas the present embodiment of FIGS. 1 to 3 discloses a preferred and favourable application of the invention, usefully constructed for large-scale production and favourably including a housing 10 made of a plastic material and adapted for the cooling circuit of a motor vehicle, the present invention is nevertheless not limited to such a configuration.

On the contrary, the present invention is suitable for any other application areas, especially with regard to pressure and line cross sections that must be adjusted or closed, a normally open or normally closed valve configuration or completely different valve principles.

Accordingly, it is within the abilities of a person with average skill in the art when setting up and parameterising such a device to adjust the operating parameters appropriately as well as the geometrical dimensions, for example setting a suitable volume of compression chamber 40 relative to pressure chamber 44, a proportionally effective line cross section for the hydraulic action (alternatively, a pneumatic version is also available), or the movement behaviour of reciprocating piston 26. While typical oscillation frequencies of reciprocating piston 26 are approximately in the range between about 0.5 Hz and 5 Hz, as in the present embodiment, for example, since typically about 20-50 oscillation strokes are required to move the tappet 18, even the present invention is not limited to these parameters.

Although the present embodiment has made efficient use of the operating fluid in flow channel 16, that is to say for example the coolant for switching, as the hydraulic fluid for effecting the control behaviour of the present invention, it is equally possible and falls within the scope of the invention, to transport and compress hydraulic fluid separate from the hydraulic circuit, from a reservoir to be provided appropriately, for example. For this purpose, the previously-described lines and apertures of fluid flow channel 16, namely intake duct 34 with filter 36, and also venting channel 52 and a leak channel 33 assigned to pump unit 24 (or to the movement space for reciprocating piston 26), would each need to be connected to such a separate hydraulic fluid reservoir isolated from fluid flow channel 16.

The invention claimed is:

1. A valve device comprising a valve tappet (18) that effects a controlled opening or blocking of a fluid flow channel (16) in an engaged position on a valve seat (22), which is movable from a starting position into the engagement position in response to pressure loading with a pressure fluid, wherein pressure fluid drawn from the fluid flow channel is conveyed by electromagnetically driven pumping means (24) into a pressure chamber (44) assigned to the valve tappet in such manner that the pressurization for driving the valve tappet is achieved through multiple pump strokes of the pumping means that comprise a delivery piston (26).

2. The device according to claim 1, wherein the delivery piston comprises a reciprocating piston (26) that executes a translationally oscillating movement, and which functions as an anchor of a coil unit (32) that is provided in stationary manner and is actuatable by application of a current.

3. The device according to claim 2, wherein a supply of the current has a first and a second signal level, each being different from a non-energized state, for defining pump stroke, and a frequency of signal change between the first and the second signal levels determines an oscillation frequency of movement of the reciprocating piston.

4. The device according to claim 2, wherein the valve tappet (18) is biased toward the starting position against a restoring force of a return spring means (48), and venting means (50) are assigned to the pressure chamber and arranged such that in a non-energised state of the coil unit, load is removed from the pressure fluid in the pressure chamber.

5. The device according to claim 4, wherein the venting means (50) are actuated in response to an actuating position of the reciprocating piston in a non-energized state, directly or via a mechanical connecting element (54) cooperating with the reciprocating piston.

6. The device according to claim 1, wherein an intake (34) for the pressure fluid is assigned to the pumping means.

7. The device according to claim 6, wherein the intake is able to be opened to the fluid flow channel (16).

8. The device according to claim 1, wherein control means assigned to the pumping means are designed and/or configured such that the valve tappet is driven in response to at least 10 pump strokes.

9. The device according to claim 8, wherein the control means assigned to the pumping means are designed and/or configured such that the valve tappet is driven in response to at least 20 pump strokes.

10. The device according to claim 8, wherein the control means assigned to the pumping means are designed and/or configured such that the valve tappet is driven in response to at least 30 pump strokes.

11. The device according to claim 1, wherein a pressure relief valve (48) having a predetermined opening threshold is assigned to the pressure chamber in such manner that the pump strokes can be executed even in the engaged position.

12. The device according to claim 1, wherein the delivery piston (26) is a reciprocating piston.

* * * * *